Oct. 8, 1946.　　A. C. MEHRING ET AL　　2,408,868
CARRIER-CURRENT PHASE-ANGLE RELAYING SYSTEM
Filed May 10, 1944

Phase-angle between currents at opposite ends of line-section

WITNESSES:

INVENTORS
Arthur C. Mehring,
Herbert W. Lensner and
Shirley L. Goldsborough.
BY
ATTORNEY Patented Oct. 8, 1946

2,408,868

UNITED STATES PATENT OFFICE 2,408,868

CARRIER-CURRENT PHASE-ANGLE RELAYING SYSTEM

Arthur C. Mehring and Herbert W. Lensner, East Orange, and Shirley L. Goldsborough, Basking Ridge, N. J., assignors to Westinghouse Electric Corporation, East Pittsburgh, Pa., a corporation of Pennsylvania Application May 10, 1944, Serial No. 534,846

23 Claims. (Cl. 175—294)

Our invention relates to improvements in pilot-channel relaying for protecting transmission lines against faults, and it has particular relation to that type of relaying in which a carrier-current channel is utilized to produce a pulsating waveform which is responsive to the phase of the line-current at a distant terminal or terminals of the protected line.

Our invention is an improvement over the carrier-current relaying system which is described and claimed in a Lensner application, Serial No. 463,237, filed December 8, 1942. The Lensner system utilized, at each terminal, a saturated-current line-current-responsive network for deriving a single-phase relaying voltage, of limited magnitude, from the polyphase line-currents at that terminal, and for causing substantially flat-topped or unmodulated carrier-current energy to be transmitted from that terminal on alternate half-cycles of the derived relaying voltage, so that, in the event of an internal fault, carrier would be transmitted on the same half-cycles of the line-current frequency, at both ends of the protected line-section, and the plate-current of the receiver tube would consist of discrete, half-cycle impulses, which have a large alternating-current component which is utilized to pick up a receiver-relay, whereas an external fault causes the half-cycle periods of carrier-current transmission to alternate, at the opposite ends of the protected line-section, so that the receiver plate-current is substantially steady or constant in value, so that it has only a very small alternating-current component, which does not pick up the receiver-relay.

This original Lensner system, as just outlined, was a pioneer system of its type, and it was quite workable, but it was subject to certain difficulties, particularly in giving inconsistent operation, over a wide range of fault-currents, due to imperfections in the saturated-current operation, in being somewhat critical as to the tuning of the carrier-current receiver, and in being somewhat sensitive to the wave form, current-magnitude, or neon-lamp characteristics of the limited-voltage network which derived the alternating-current relaying voltage from the line-current transformers.

Our present invention is devised for the purpose of overcoming these and other difficulties, and for the purpose of greatly simplifying the circuits and apparatus necessary for carrying out the general purpose of the Lensner invention.

A more particular object of our invention is to utilize received carrier-current energy for the purpose of restraining the operation of the receiver-relay tube, or the tube which responds to received carrier-current energy and which energizes the receiver-relay, instead of utilizing the same to cause such operation. We provide a locally energized means for producing an operating voltage during half-cycles of the derived current-responsive voltage, the operating voltage being opposite in sign from the restraining voltage, but of smaller magnitude, so that no plate-current is obtained in the receiver-relay tube if the half-cycle periods of carrier-current transmission at the remote end of the protected line-section coincide with the half-cycle impulses of the locally derived operating voltage. In other words, we transmit carrier on derived line-current half-cycles of one polarity, and we produce an operating-voltage for the grid of the receiver-relay tube on half-cycles of the opposite polarity, and we utilize the receipt of carrier-current energy to produce a restraining voltage, in the grid-circuit of the receiver-relay tube.

A further object of our invention is to provide a trigger-circuit utilizing two gas triodes, or two grid-controlled gas tubes, having their grid-circuits responsive to alternate potentials or half-cycles of the derived current-responsive relaying-voltage, so that each tube fires at an early portion of the line-current half-cycle to which it responds, the two tubes being interconnected together in such way that the firing of either tube extinguishes the other tube. With a steady direct-current plate-voltage for energizing these two gas tubes, we are thus able to obtain alternate half-cycle periods of tube-operation, first one tube operating and then the other, in response to alternate half-cycles of the derived line-current, producing square-topped half-cycle plate-current waves which are steady in value and which are practically unaffected by the line-current wave-form or magnitude, so that the apparatus is not critical in its response to the derived line-current or relaying-voltage.

A more specific object of our invention is to utilize these two trigger-circuit gas triodes respectively for causing the intermittent transmission of carrier, and for controlling the intermittent production of the operating voltage for the grid of the relay-tube.

With the foregoing and other objects in view, our invention consists in the circuits, systems, apparatus, combinations, parts, and methods, hereinafter described and claimed, and illustrated in the accompanying drawing, wherein:

Figure 1:
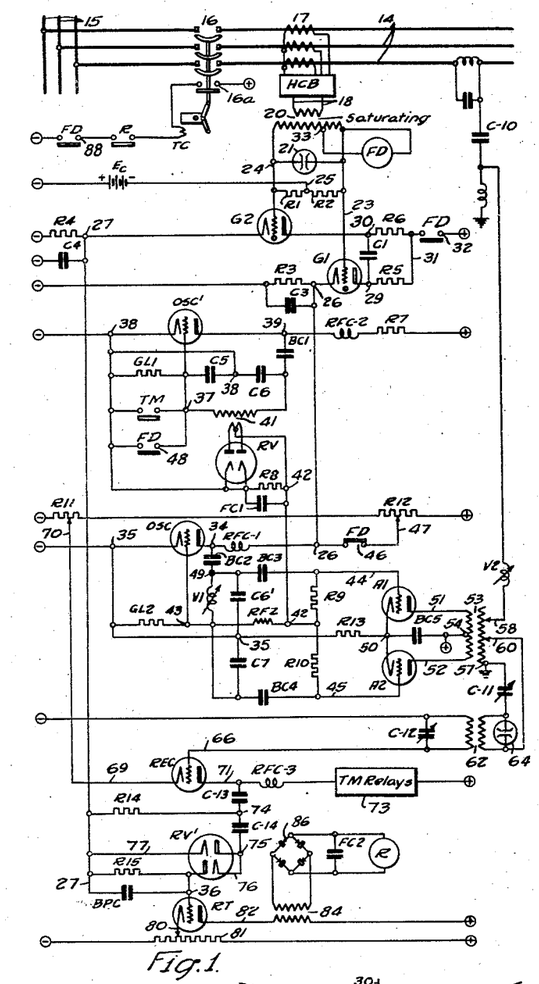
Figure 1 is a diagrammatic view of circuits and apparatus illustrating an embodiment of our invention.

In Fig. 1, we show the terminal equipment for only one terminal of a three-phase transmission line 14, which is connected to a bus 15 through a three-phase circuit-breaker 16. Only one terminal equipment is illustrated, because the equipments at the other line-terminal or terminals are, or may be, identical to the illustrated equipment. The circuit-breaker 16 is illustrated as having a trip-coil TC, and an auxiliary make-contact breaker-switch 16a. The three-phase line-current is derived by means of a bank of line-current transformers 17, which respond to current-flow into the protected line-section, at the terminal in question, and this three-phase line-current is fed into any suitable network or filter, which is marked HCB, for deriving a single-phase alternating-current voltage at the network-terminals 18.

Any suitable network may be utilized for the network marked HCB, the idea being to derive a single-phase relaying quantity which is representatively responsive to all different kinds of fault-currents. There are different networks for this purpose, a suitable one being the socalled Type HCB network which is shown in the Harder patent, 2,183,646, granted December 19, 1939, and assigned to Westinghouse Electric & Manufacturing Company. This HCB network is responsive to a combination of the positive-sequence and zero-sequence components of the line-current.

Usually and preferably, but not necessarily in accordance with our present invention, the derived network-voltage is of limited magnitude, which may be accomplished by some saturating means such as a saturating transformer 20, the secondary terminals of which are shunted by a voltage-limiting glow-tube 21, as described in the Harder patent.

According to our invention, we provide two gas triodes or other grid-controlled gas tubes G1 and G2 of a sustained-discharge type; that is, of a type in which the grid fires the tube, or starts the discharge, but is unable to extinguish the tube or interrupt the discharge. The grids of these tubes G1 and G2 are connected to the respective secondary terminals 23 and 24 of the saturating transformer 20. An intermediate voltage of the secondary transformer-circuit is derived from two serially connected resistors R1 and R2, which are connected across the secondary terminals 23 and 24. The connecting-point 25 between these resistors is connected to a negative battery-terminal or bus (—), through a C-battery Ec, which is so connected as to make the point 25 more negative than the negative battery-terminal (—), or, in general, so as to make the point 25 have a potential too negative, by a predetermined amount, to cause the tubes G1 and G2 to fire, under the impressed anode-cathode voltage-conditions.

The cathode-circuits 26 and 27 of the gas tubes G1 and G2 are connected to the negative battery-terminal (—) through cathode-resistors R3 and R4, respectively. The anode-circuits 29 and 30 of the respective gas tubes G1 and G2 are respectively connected to plate-resistors R5 and R6, the other terminals of which are connected to a common conductor 31 which is connected, through a make-contact 32 of a fault-detector FD, to the positive battery-terminal (+). The fault-detector operating-coil, also marked FD, is energized from a secondary tap 33 of the saturating transformer 20. The two anode-circuits 29 and 30 of the gas tubes G1 and G2 are joined by an interconnecting circuit containing a capacitor C1.

The two gas tubes G1 and G2 are thus connected in a so-called "trigger" circuit, which operates as follows: During line-current half-cycles of one polarity, which we will call the negative half-cycles, or more specifically during the negative half-cycles of the derived current-responsive voltage of the saturating transformer 20, the secondary terminal 23 is positive. At an early stage in these negative half-cycles, the positive voltage of the secondary terminal 23 with respect to the secondary intermediate point 25, becomes more positive than the blocking bias of the C-battery Ec, and the first gas tube G1 fires. It will be understood that the gas tubes have such characteristics that, when they are once fired, or when current is once started in their plate-cathode circuits, such plate-cathode current will continue to flow until the voltage applied across the plate and cathode terminals of the tube is reduced to zero or reversed, even for a moment. At the beginning of the next-half-cycle of the output-voltage of the saturating transformer 20, which we call a positive half-cycle, the other secondary terminal 24 becomes positive with respect to the secondary intermediate point 25, and fires the second gas tube G2.

Before the firing of the second tube G2, the potential of its plate-circuit 30 was substantially the potential of the positive battery-terminal (+), assuming that the fault-detector contact 32 is closed, while the potential of the plate-circuit 29 of the first tube G1 was at a somewhat more negative value, due to the voltage-drop in the plate-resistor R5 of the first tube. When the second tube G2 fires, however, its plate-circuit 30 tends to drop to the same potential as the plate-circuit 29 of the first tube, but the voltage-charge on the interconnecting capacitor C1 causes the potential of the anode-circuit 29 of the first tube G1 to momentarily drop to a value which is more negative than the potential of the cathode circuit 26 of said first tube G1, thus extinguishing the first tube G1 in the moment required for the discharge of the interconnecting capacitor C1. In the next half-cycle, the first tube G1 fires again, and in turn extinguishes the second tube G2 by momentarily causing a negative voltage to exist across its plate-cathode terminals.

The function of the interconnecting capacitor C1, which shunts off the previously firing gas tube when the second tube begins to fire, is preferably supplemented by two capacitors C3 and C4, which are connected in shunt across the respective cathode-resistors R3 and R4 of the two gas-tubes G1 and G2. The effect of these shunting-capacitors C3 and C4 is to short-circuit the associated cathode-resistor, R3 or R4, at the first instant of firing of the associated gas-tube, G1 or G2, as the case may be, thus momentarily bringing the anode-potential of the newly fired tube to a value which is more negative than the steady-state anode-potential of the tube which was previously firing.

The interconnecting capacitor C1, previous to the firing of the newly fired tube, was charged in such polarity as to momentarily tend to hold the anode-potential of the previously firing tube more negative than the anode-potential of the newly fired tube.

The combined effect of the three capacitors

C1, C3 and C4 is to strongly depress the anode-potential of the tube which was firing, at the first instant of firing of the second tube, making the anode-potential of the first tube momentarily more negative than its cathode-potential, thus extinguishing the tube. At the same time, the shunting-capacitor C3 or C4, as the case may be, of the tube that is being extinguished, momentarily holds up its cathode-potential to a value close to the value which it had when the tube was firing, thus assisting in maintaining the reversed tube-voltage for the instant necessary to extinguish the tube.

According to our invention, we utilize the voltage-drops across the two cathode-resistors R3 and R4 to produce two different effects. The voltage-drop across the cathode-resistor R3 of the first gas tube G1 is utilized to produce half-cycle impulses of square-topped positive voltages for supplying a plate-voltage which is sufficient for initiating and maintaining the operation of an oscillator-tube OSC of a carrier-current transmitter, by connecting the plate-circuit 34 of the oscillator-tube OSC, through a radio-frequency choke RFC—1, to the cathode-circuit 26 of the first gas tube G1, the cathode of the oscillator being connected, at 35, to the negative battery-terminal (—). The voltage-drop across the cathode-resistor R4 of the second gas tube G2 is utilized to apply an operating voltage-component from the cathode-circuit 27 of the second tube G2 to the grid-circuit 36 of a relay-tube RT, which will be subsequently described. A voltage-drop resistor R15 is included in the connection between the cathode-circuit 27 of the second trigger-tube G2 and the grid-circuit 36 of the relay-tube RT.

Before further describing the carrier-current transmitter, we will refer to other functions of the carrier-current equipment, which may be utilized during periods of no fault on the protected line-section 14. We have exemplified these other or auxiliary carrier-current functions by means of a telemetering contact TM, which is utilized to control the transmitter-oscillator OSC, either directly or indirectly. In the illustrated form of embodiment, the telemetering contact TM is utilized indirectly to control the grid-circuit 37 of an auxiliary oscillator OSC', which we call a keyer-oscillator. This keyer-oscillator OSC' has a cathode-circuit 38 which is connected directly to the negative bus-terminal (—), and it has a plate-circuit 39 which is connected to the positive bus (+) through a radio-frequency choke RFC—2 and a resistor R7.

The cathode-circuit 38 of the keyer-oscillator OSC' is also connected to the mid-point between two capacitors C5 and C6, which cooperate with the primary winding of a transformer 41 to provide a tuned oscillator-circuit, which is preferably, although not necessarily, tuned to a frequency which is higher than that of the main transformer-oscillator OSC. The other terminal of the capacitor C5, that is, the terminal opposite to the terminal 38, is connected to the grid-circuit 37 of the keyer-oscillator OSC', while the other terminal of the capacitor C6 is connected, through a blocking capacitor BC1, to the anode-circuit 39 of the keyer-oscillator OSC'. The keyer-oscillator OSC' is also provided with a grid-leak GL1, which is connected between the grid-circuit 37 and the cathode-circuit 38.

The secondary circuit of the transformer 41 of the keyer-oscillator apparatus is utilized to energize a double-wave rectifier-valve RV so as to energize a rectified-current loading-resistor R8 in such polarity as to provide a negative or blocking bias on a grid-control circuit 42. This grid-control circuit 42 is connected to the negative bus (—) through said loading-resistor R8 which is energized from the rectifier-valve RV. The loading-resistance R8 is preferably shunted by a filter-capacitor FC1, which smoothes out the ripples of the unidirectional voltage appearing across the terminals of the resistor R8.

The energization of the loading-resistor R8, through the rectifier-valve RV, from the keyer-oscillator OSC', is such that a negative or blocking voltage is applied to the grid-circuit conductor 42 whenever the keyer-oscillator OSC' is oscillating, but when the oscillations of the keyer-oscillator OSC' are blocked, the voltage-drop through the loading-resistor R6 becomes negligible, so that the grid-circuit conductor 42 is substantially at the potential of the negative battery-source (—).

The keyer-oscillator apparatus just mentioned is more particularly described and claimed in a Lensner application Serial No. 530,134, filed April 8, 1944.

The grid-circuit conductor 42 of the keyer-oscillator apparatus is utilized for controlling the operation of the carrier-current transmitter which comprises the previously mentioned oscillator OSC, and two amplifier-tubes A1 and A2. The grid-control circuit 42 is connected to the grid-circuit 43 of the transmitter-oscillator OSC through a radio-frequency impedance RFZ, and it is connected to the grid-circuits 44 and 45 of the amplifier-tubes A1 and A2, by two voltage-dividing resistors R9 and R10, respectively.

In order that plate-voltage may be provided for the transmitter-oscillator OSC during times when there is no fault on the transmission-line 14, the circuit 26 may be connected to the positive battery-terminal (+) through a back-contact 46 of the fault-detector FD. In the illustrated embodiment of our invention, instead of being directly connected to the positive terminal (+), the contact 46 is connected to a tap-point 47 near the positive end of a potentiometer R11—R12 which is connected across the direct-current terminals (+) and (—).

In operation, the keyer-oscillator OSC' normally oscillates, imposing a blocking bias on the grid-control circuit 42, so as to block the operation of the transmitter-oscillator OSC. When the telemetering-key TM is closed, however, the grid-leak GL1 of the keyer-oscillator OSC' is short-circuited, blocking the operation of said keyer-oscillator, and thus removing the blocking bias from the grids of the transmitter-oscillator OSC and two amplifier-tubes A1 and A2 of the carrier-current transmitter, permitting the carrier-current transmitter to oscillate.

In order to prevent an unwanted blocking of the grid-control circuit 42 at times when there is a fault on the transmission system, another fault-detector make-contact 48 is utilized, in shunt with the telemetering-key TM, so that the closing of this fault-detector contact will prevent the operation of the keyer-oscillator OSC' when the telemetering-key TM is open. Thus, the closing of the fault-detector contact 48 removes the biasing voltage from the grid-control circuit 42.

The grid-circuit 43 of the transmitter-oscillator OSC is connected to the cathode-circuit 35 of said oscillator through a grid-leak resistor GL2.

The anode-circuit 34 of the transmitter-oscillator OSC is coupled, by means of a blocking capacitor BC2, to a conductor 49, which constitutes one junction-point of a tuned circuit which includes the conductor 49, a capacitor C6′, the cathode-terminal 35, a capacitor C7, the grid-terminal 43, and a variometer V1, and thence back to the conductor 49. The conductor 49 and the grid-terminal 43 are connected to the grid-terminals 44 and 45 of the amplifiers A1 and A2 by means of blocking capacitors BC3 and BC4, respectively.

The amplifier-tubes A1 and A2 have a common cathode-circuit 50, which is connected to the negative battery-terminal (—), through a cathode-resistor R13. The amplifier-tubes A1 and A2 have plate-circuits 51 and 52, respectively, which are connected to the primary-winding terminals of a coupling-transformer 53. The primary-winding mid-point 54 of this transformer is connected to the positive battery-terminal (+), and it is also connected, through a blocking capacitor BC5, to the cathode-terminal 50 of the amplifier-tubes.

One secondary-winding terminal of the coupling-transformer 53 is grounded, at 57. Another tap-point 58 thereof is connected to a variometer V2, and thence, through a coupling capacitor C—10, to one of the line-conductors of the protected line-section, in a manner which is well-known and needs no further description.

The secondary winding of the coupling-transformer 53 is provided with another tap-point 60, which is connected to one terminal of the primary winding of a receiver-coupling transformer 62, the other primary-winding terminal of which is connected, through a variable capacitor C—11, to the grounded point 57. The primary winding of the receiver-coupling transformer 62 is also usually shunted by a voltage-limiting gas-tube 64.

The receiver-coupling transformer 62 has a secondary winding, one terminal of which is connected to the grid-circuit 66 of a detector-tube or receiver-tube REC, while the other secondary-winding terminal is connected to the negative battery-terminal (—). The secondary winding of the receiver-coupling transformer 62 is also shunted by a variable capacitor C—12, in a manner which is usual in the art.

The receiver-tube REC is provided with a cathode-circuit 69 which is illustrated as being connected to a tap-point 70 near the negative end of the potentiometer R11—R12. This tube also has an anode-circuit 71, which is connected to the positive battery-terminal (+), through a radio-frequency choke RFC—3 and the telemetering relays, which are indicated diagrammatically at 73.

In accordance with our invention, the plate or anode-circuit 71 of the receiver-tube REC is also coupled, by means of a capacitor C—13, to a point 74 which is connected to the cathode-circuit 27 of the second tube G2 through a large capacitor-charging resistor R14. The point 74 is also connected, through a capacitor C—14, to a conductor 75 which is connected to the cathode-terminal 76 of the lower diode of a double-wave rectifier-valve RV′. The plate-circuit of this lower diode is connected to the grid-terminal 36 of the relay-tube RT and to the voltage-drop or load-resistor R15. The other terminal of the load-resistor R15 is connected to the cathode-circuit conductor 27 of the second gas triode G2 as previously described. The upper diode-circuit 77 of the double-wave rectifier-valve RV′ is connected, in the reverse polarity, between the circuits 27 and 75. The load-resistor R15 is shunted by a radio-frequency by-pass capacitor BPC.

The relay-tube RT is provided with a cathode-circuit 80 which is connected to an intermediate point of a potentiometer 81, the terminals of which are connected across the battery-terminals (—) and (+). The relay-tube RT is also provided with a plate-circuit 82, which is connected to the positive battery-terminal (+), through the primary winding of a relay-coupling transformer 84, the secondary of which is connected, through a rectifier-bridge 86, to the operating coil R of a receiver-relay R. The relay R is provided with a make-contact R, which is shown near the top of Fig. 1, in series with the trip-coil TC of the circuit-breaker 16. The output of the rectifier-bridge 86 may be smoothed, if desired, by means of a filter-capacitor FC2.

Our fault-detector FD is provided with a make-contact 88 which is connected in the tripping circuit of the circuit-breaker 16, said tripping circuit being traceable from the negative battery-terminal (—), through the make-contact 88, and the receiver-relay contact R, to the trip-coil TC, and thence through the breaker-switch 16a to the positive battery terminal (+).

The operation of the apparatus shown in Fig. 1 may best be explained with reference to the curve-diagrams of Figs. 2 to 13. The filter HCB of Fig. 1, with its associated saturating transformer 20 and voltage-limiting gas tube 21, produces an output-voltage, one part of which appears across the conductors 24 and 25, and which is indicated, in Fig. 2, as a substantially sinusoidal single-phase wave which has an approximately constant limiting magnitude, for all except the smallest of fault-currents, and which has a phase-angle which is determined by a predetermined function of the polyphase line-current at the relaying station, said function being determined by the characteristics of the filter, such as the diagrammatically illustrated filter marked HCB.

It is usually desirable to transmit carrier-current energy, for protective relaying purposes, only during times of a fault somewhere on the transmission system, and hence it is desirable to utilize some sort of fault-detector. In Fig. 1, we have illustrated a fault-detector FD in the form of an overvoltage relay which is energized from the saturating transformer 20, and which responds to the lightest faults to which a response is required. When this fault-detector responds, it picks up its make-contacts 32, 48 and 88, and it opens its back-contact 46. The make-contact 32 applies the direct-current battery-voltage to the plate-cathode circuits of the two gas triodes G1 and G2.

Figure 2:
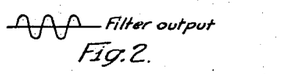
Figs. 2 to 13 are curve-diagrams which will be referred to in the explanation of the invention.
Figure 3:
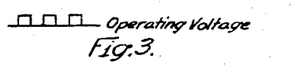

At a very early stage in each positive half-cycle of the filter-output of Fig. 2, the second gas triode G2 fires, and produces a positive voltage-impulse, which is obtained across the cathode-resistor R4, and comprises the voltage from the negative battery-terminal (—) to the conductor 27 in Fig. 1. We call this the operating voltage, as shown in Fig. 3, because it is a voltage which tends to make the grid-terminal 36 of the relay-tube RT positive with respect to the cathode-circuit 80 of this tube, thus tending to cause current to flow in the plate-circuit 82 of the tube. Since the gas triode G2 is energized from battery-terminals (—) and (+) having a fixed voltage between them, and since the plate-cathode circuits 30—27 of this triode are in series with fixed resistors R6 and R4, the positive voltage-impulses which make up the operating voltage are square-topped, and of a substantially constant magnitude, quite irrespective of the magnitude of the filter-output or the wave-form of the filter-output. This is a considerable advantage, constituting a marked improvement over anything that was previously utilized in this art.

At a very early period in each negative half-cycle of the filter-output which is shown in Fig. 2, the first gas triode G1 of Fig. 1 fires, immediately extinguishing the previously firing triode G2, in a manner which has previously been described. The operation of the first gas triode G1 produces a succession of positive voltage-impulses which alternate with the positive impulses which constitute the operating voltage of Fig. 3. The positive voltage-impulses of the first triode G1 are obtained across the cathode-resistor R3, in the form of a positive voltage which appears between the negative battery-terminal (—) and the conductor 26, which is connected to the plate-circuit 34 of the transmitter-oscillator OSC, through the radio-frequency choke RFC—1 of Fig. 1. This causes the oscillator OSC to immediately begin oscillating, thus initiating the transmission of carrier. The transmission of carrier continues, at approximately its full, constant strength, as long as the first gas triode G1 is firing, which is to say, during the negative half-cycles of the filter-output of Fig. 2, as shown diagrammatically in Fig. 4.

Figure 4:
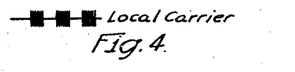

In Fig. 4, the frequency of the carrier-current waves cannot be shown to scale, because the carrier-current frequency is actualy so high that it could not begin to be shown in the space which we have allotted to Fig. 4.

After the first impulse of carrier-current transmission, during the first negative half-cycle of the filter-output after the response of the fault-detector FD, the second gas triode G2 again becomes conducting, extinguishing the first triode G1, and thus interrupting the carrier-current transmission for a half-cycle period, corresponding to the next positive half-cycle of the filter-output.

Figure 5:
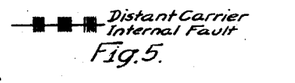

It will be noted that the action just described occurs at both terminals of the protected line-section 14, or at all of the terminals, in case the protected line-section has more than two terminals. It will be noted that the equipment at each terminal responds to the line-current input into the protected line-section at its terminal, that is, from the bus 15 at that terminal. In the event of an internal fault, that is, a fault within the confines of the protected line-section, the fault-current will be flowing into the line-section at each terminal thereof, and these fault-currents will be more or less in phase with each other, because the terminal-voltages of the line are not greatly out of phase with each other, while the line-impedance which limits the fault-current from each terminal to the fault-location has approximately the same impedance-angle in each case. For an internal fault, therefore, we may assume, as a first approximation, that the fault-currents are in phase with each other at both or each of the line-terminals. This is depicted in Fig. 5, which shows that the distant carrier, which is transmitted at another line-terminal other than the illustrated line-terminal, is transmitted at the same time as the local carrier which is shown in Fig. 4, for an internal fault.

Figure 6:
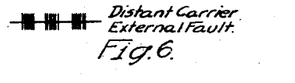

In the event of an external fault, however, current will be flowing out of the line-terminal which is closest to the external fault, and it will be flowing into the protected line-section at at least one other terminal. Since each terminal equipment responds to a current-direction looking into the protected line-section at that terminal, the line-current at the terminal closest to the external fault will be reversed, approximately 180° in the ideal case, with respect to the current in some other terminal. Hence, at each terminal, local carrier will be transmitted at certain half-cycles of the line-frequency, as shown in Fig. 4, and distant carrier will be transmitted at some distant terminal during line-frequency half-cycles which are displaced approximately 180° (in the ideal case) with respect to the line-frequency half-cycles of the local carrier. Fig. 6 depicts the distant carrier-current transmission for an external fault.

In the operation of the particular system shown in Fig. 1, it will be noted that carrier-current energy, from both the local and distant transmitters, is received by the receiver-tube REC, so as to produce a plate-cathode current through this tube during periods when the carrier-current energy is being received.

When no carrier-current energy is being received, the anode-terminal 71 of the receiver-tube REC is practically at the potential of the positive battery-terminal (+), and hence the capacitor C—13 is charged in accordance with the potential-difference between said anode-terminal 71 of the receiver and the cathode-terminal conductor 27 of the second gas triode G2, the receiver-connected terminal of the capacitor C—13 being positive. The conductor 27 has a potential such as is depicted in Fig. 3, varying between zero, which is taken as the potential of the negative battery-terminal (—), and a fraction of the total battery-voltage, which is utilized as the operating-voltage for the grid-circuit 36 of the relay-tube RT, this operating-voltage being the voltage-drop of the cathode-resistor R4 of the second gas triode G2, whenever the latter is firing.

When carrier-current energy is received, the receiver-tube REC becomes conducting, pulling down the potential of its anode-terminal 71 to a point which is more or less close to the potential of the negative battery-terminal (—), thus more or less short-circuiting the capacitor C—13, and causing it to discharge, drawing current through the load-resistor R15 and the lower diode of the rectifier-valve RV', said diode being connected in such polarity as to permit current-flow in the direction from the conductor 27 to the conductor 36, and thence through the lower diode to the conductor 76 and the capacitors C—14 and C—13. At the same time, a much smaller current flows through the much larger capacitor-charging resistance R14, which is utilized to charge the capacitor C—13.

During the periods when no carrier-current energy is being received, in the illustrated form of embodiment of our invention, the receiver plate-circuit 71 again becomes quite positive, so that the upper diode-circuit 77 of the rectifier-valve RV' becomes conducting and charges the capacitor C—14, making the terminal 74 positive and the terminal 75 negative, thus causing the capacitor C—14 to act as a voltage-doubler for doubling the effective voltage of the capacitor C—13.

When, therefore, carrier-current energy is again received, on the next half-cycle of the line-frequency current, the two capacitors C—14 and C—13 discharge through the load resistor R15, thus producing a negative or restraining voltage-drop in the load resistor R15, making the conductor 36, and hence the grid of the relay-tube RT, negative with respect to the potential of the cathode-circuit conductor 27 of the second gas tube G2. The reception of carrier-current thus causes the capacitors C—14 and C—13 to discharge, producing a voltage-drop in the load-resistor R15, making the grid of the relay-tube RT more negative, and thus effectually preventing this tube from operating in response to the operating-voltage which is produced by the current-flow in the cathode-resistor R4 of the second gas tube G2.

The radio-frequency or carrier-frequency component of the plate-voltage of the receiver-tube REC is by-passed from the load-resistor R15 by the by-passing capacitor BPC.

Figure 7:
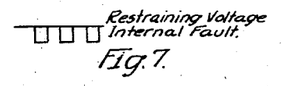
Figure 8:
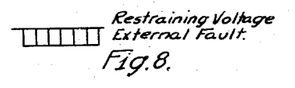

Fig. 7 shows the negative or restraining voltage, across the resistor R15, for an internal fault in which the fault-currents are in phase with each other at both or all of the line-terminals, while Fig. 8 shows the corresponding restraining voltage for an external fault in which the outwardly flowing current at one line-terminal is exactly 180° out of phase with the inwardly flowing current or currents at the other terminal or terminals of the protected line-section.

The receiver-tube REC preferably has a constant-current characteristic, so that whenever its grid permits plate-current to flow, the plate-current will have an approximately constant value. Thus, as shown in Fig. 8, the half-cycles of receiver plate-current, during which carrier-current energy is being received by the receiver-tube REC from the distant carrier, transmitted from some other line-terminal, are of an approximately fixed magnitude, regardless of carrier-current attenuation. Hence the restraining voltage-impulses in the resistor R15 are of an approximately fixed magnitude. The receiver plate-current impulses which are received from the distant carrier are of approximately the same magnitude as the half-cycle impulses of plate-current which are produced when carrier-current energy is being received from the local transmitter, even though the local signals may be the stronger.

Figure 11:
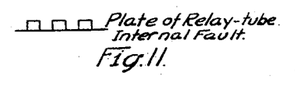

It is preferable, also, that the relay-tube RT shall have a constant-current characteristic, so that its plate-current shall be constant, as shown in Fig. 11, without sensitive dependence upon the precise magnitude of its grid-voltage. Thus, the exact amount of the restraining voltage, produced by the receipt of carrier-current energy, as shown in Fig. 8, is not important, so long as said restraining voltage is greater than the operating voltage of Fig. 3, or the voltage-drop in the resistor R4, by a safe margin.

It is further to be noted that the only carrier-current response of any moment is the response to the distant carrier, that is, the carrier-current impulses which are transmitted from some other line-terminal or terminals. The carrier-current energy received from the local carrier-current transmitter is immaterial, because, by the very nature of the control, it is always transmitted (and received) during the half-cycles alternating between the half-cycles when the operating impulses of Fig. 3 are present.

The grid-voltage of the relay-tube RT is thus made up of three components: First, there is a negative grid-bias consisting of the voltage between the potentiometer-tap 80 and the negative battery-terminal, which is sufficient to bias the grid of the relay-tube RT so that no plate-current flows in said tube when there is no restraining or operating voltage present. A second component of the grid-voltage of the relay-tube RT is the operating voltage, in the form of positive voltage-impulses produced whenever the cathode-circuit current of the second gas tube G2 flows through the cathode-resistor R4, as shown in Fig. 3. The third grid-voltage component of the relay-tube RT is the restraining voltage, in the form of negative voltage-impulses as shown in Figs. 7 and 8, for an internal fault and an external fault, respectively. This restraining voltage is produced by the discharge of the capacitors C—14 and C—13 through the resistor R15 whenever carrier-current energy is being received from any line-terminal, although the restraining impulses which are received from a distant line-terminal are the only ones of importance. The resultant grid-voltage of the relay-tube RT is shown in Figs. 9 and 10, for an internal fault and an external fault, respectively.

Figure 9:
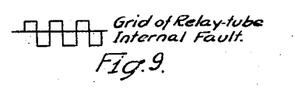
Figure 10:
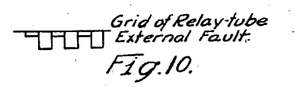

Since the relay-tube RT will be operated, or carry a plate-current, only when its grid is sufficiently positive with respect to its cathode, a plate-current will flow in the relay-tube RT only during the positive half-cycles of the grid-voltages shown in Figs. 9 and 10, that is, only when the local operating impulses of the second-valve cathode-circuit conductor 27 and its cathode-resistor R4 are not opposed by the restraining impulses received from a distant line-terminal.

When there is an internal fault, accompanied by fault-currents which are in phase with each other at the several line-terminals, the plate-current of the relay-tube RT takes the form of a succession of square-topped half-cycles corresponding in timing to the line-frequency half-cycles when the second gas tube G2 is firing, as depicted in Fig. 11, thus energizing the local tripping-relay R and causing a local tripping-operation.

Figures 12, 13:
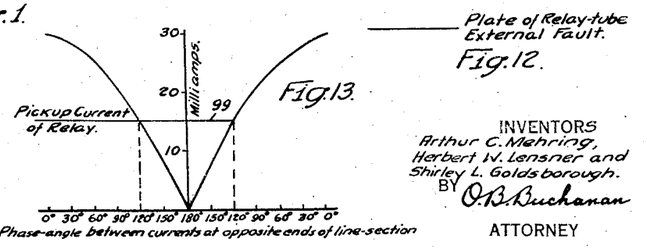

In the case of an external fault, with line-currents exactly 180° out of phase with each other, the grid-biasing voltage of the relay-tube RT is entirely negative, as shown in Fig. 10, and the plate-current of the relay-tube RT is zero, as shown in Fig. 12, meaning no response of the relay R, and hence no tripping-operation.

While we have discussed the ideal cases of an internal fault in which there is a 0° phase-angle between the terminal line-currents, and an external fault in which there is a 180° phase-displacement, counting inwardly flowing currents as positive, or in phase with each other, at each terminal, it is to be noted that, in actual cases, the terminal line-currents for internal faults will not, in general, be exactly in phase with each other, but will vary in phase, by a certain amount, so that the impulses of the plate-current of the relay-tube will be shorter than the half-cycle impulses shown in Fig. 11, depending upon the phase-angle, because the operating impulses of Fig. 3 will be partially overlapped or blocked by received impulses from the distant transmitter, according to the phase-angle between the fault-currents at the different stations.

Fig. 13 shows a plot of the integrated, or root-mean-square, or averaged, current in the relay-coil R, in milliamperes, plotted against the phase-angle of the terminal line-currents. It shows that, as the phase-angle departs from zero, in either the leading direction or the lagging direction, the relay-current falls off, or becomes smaller and smaller, until the phase-angle becomes 180°. The receiver-relay R is really an overcurrent relay, and it is adjusted to have a pick-up value 99 (Fig. 13) which permits the internal-fault currents at the several terminals to be out of phase with each other as much as 120°, while still permitting the fault-responsive receiver-relay R to pick up. This leaves the phase-angles between 120° and 180° to represent external-fault conditions, during which the relay R does not pick up. It will be understood, of course, that the pick-up value of the relay-current can be set for any desired magnitude, corresponding to any desired phase-angle between the terminal line-currents, in accordance with the necessities of special conditions existing on any particular line.

The relay-tube RT preferably has a constant-current characteristic, so that whenever its grid permits plate-current to flow, the plate-current will have an approximately constant value, as shown in Fig. 11, without sensitive dependence upon the precise magnitude of the grid-voltage. Hence, the integrated, or root-mean-square, or average, value of the plate-current will depend only upon the relative lengths of the time-periods during which the plate-current is flowing, as shown in Fig. 13.

Since the relay-current is measured in milliamperes, it is usually more convenient to utilize a sensitive polarized relay R, or other sensitive direct-current relay R, to respond to this plate-current, rather than utilizing an alternating-current relay for this purpose. For this reason, we have provided the plate-circuit transformer 84, and the rectifier-bridge 86, so that we may utilize a sensitive direct-current milliampere-relay R, as shown in Fig. 1.

The relay R, as previously described, has a make-contact in the tripping-circuit of the breaker 16, so that, whenever the relay R picks up, the circuit-breaker 16 is tripped. Because of the sensitive nature of the relay R, and the possibility of shock-excitation of the carrier-current receiver-circuits due to static conditions, or the like, it is usually desirable to safeguard the tripping-circuit by providing some additional fault-responsive contact, in addition to the contact of the relay R, and we have provided for this, in Fig. 1, by means of the contact 88 of the fault-detector FD, which is intended to be representative of any fault-detector contact which is controlled independently of the carrier-current channel, and which is intended merely to make sure that there is a fault somewhere on the transmission system, before a tripping operation is permitted in response to the receiver-relay contact R.

During fault-free conditions, when there is no fault on the transmission system, it is usually desirable to make use of the carrier-current channel for purposes other than protective relaying. We have illustrated such purposes in the form of the telemetering-key TM. When there is no fault on the transmission system, the fault-detector FD is unresponsive. The fault-detector contact 32, in the energizing-circuit of the two gas triodes G1 and G2, prevents the production of any voltage-drops across the cathode-resistors R3 and R4 of these gas triodes. The drop across the resistor R3 prevents the production of any triode-responsive plate-voltage for causing carrier-current transmission as a result of the operation of the transmitter-oscillator OSC. The drop across the resistor R4 prevents the production of any operating voltage on the grid of the relay-tube RT.

In order to provide an energizing-circuit for the transmitter-oscillator OSC, which is available during no-fault periods of the normal transmission-line operation, we provide the fault-detector contact 46, which connects the circuit 26 to the positive battery-terminal (+) under these conditions. At the same time, however, that is, when there is no fault on the transmission system, the faul-detector contact 48 is open, so that the normally open position of the telemetering-key TM makes it possible for the keyer-oscillator OSC' to oscillate, thus developing a biasing voltage-drop in the load-resistor R8, and blocking the operation of both the transmitter-oscillator OSC and its associated amplifier-tubes A1 and A2, during these conditions, which may be regarded as corresponding to the normal conditions when there is no fault on the transmission system.

When it is desired to utilize the carrier-current channel during fault-free conditions, carrier-current transmission is started, and controlled or modulated, in any desired manner, according to the use which is to be made of the channel. For telemetering uses, the telemetering-key TM is rapidly closed and opened, at a certain rate, or according to a predetermined code, thus causing carrier to be transmitted during the moments when the key TM is closed, and operating the telemetering relay 73, at both ends of the protected line-section, in accordance with the manipulation of the telemetering-key TM.

Since our illustrated system utilizes only one fault-detector, which is shown at FD, it is necessary to guard against erroneous relay-operation in the event of a distant fault which might cause a picking up of the fault-detector at only one end of the protected line-section. To eliminate the possibility of incorrect relaying under these conditions, we prefer to arrange the circuit constants so that the gas triode G1 which controls carrier fires at a lower voltage of the filter output-circuit 23—24 than the gas triode G2 which provides operating voltage to the grid-circuit 36 of the relay-tube RT.

The gas triode G1 which controls carrier fires at about the same time that the fault-detector FD picks up, preferably immediately upon the attainment of a voltage which will cause the detector FD to pick up. The second gas triode G2 fires at a grid-voltage which is sufficiently above the pick-up voltage of the detector FD to insure that the fault-detectors FD at both ends of the line-section will pick up before the second gas triode G2 applies an operating voltage to the relay-tube RT at either end of the line. Consequently, if only one fault-detector picks up, at only one end of the line, there will not be enough control-voltage across 23 and 24 to cause the diode G2 to fire at either end of the line, and hence the relay-tube RT cannot carry current to operate the receiver-relay R at either end of the line.

In Fig. 1, the resistor R2 is illustrated as being larger than R1, so that, with identical tubes G1 and G2, the tube G1 will receive the larger portion of the voltage across 23 and 24. The tube G2 may fire at a voltage which is 20% to 50% above the control-voltage (across 23 and 24) which results in the firing of the tube G1.

While we have illustrated our invention in but a single form of embodiment, which we at present prefer, we desire it to be understood that such illustration is only illustrative, and that various changes of omission and addition and substitution may be made without departing from many of the essential features of our invention, as will be well understood by those skilled in the art. We desire, therefore, that the appended claims shall be accorded the broadest construction consistent with their language.

We claim as our invention:

1. Terminal equipment for one terminal of a pilot-channel phase-angle relaying system for an alternating-current transmission-line, comprising line-current-responsive means for deriving a succession of substantially flat-topped operating impulses at times during positive line-current half-cycles, line-current-responsive pilot-channel means for transmitting a succession of restraining impulses to another line-terminal or terminals at times during negative line-current half-cycles of the line-current at the relaying terminal at which said terminal equipment is located, and relay-means for developing a variable operating force only during those portions of the operating impulses during which no restraining impulses are being received from a distant line-terminal.

2. Terminal equipment for a pilot-channel phase-angle relaying system for an alternating-current transmission-line, comprising line-current-responsive means, operative during conditions of fault on the transmission system, for deriving a succession of substantially constant-magnitude operating-impulses, each of substantially half-cycle duration, in response to successive line-current half-cycles of one polarity, at the relaying terminal; line-current-responsive pilot-channel means, operative during conditions of fault on the transmission system, for transmitting a succession of substantially constant-magnitude restraining-impulses, each of substantially half-cycle duration, to another line-terminal or terminals in response to successive line-current half-cycles of the opposite polarity, at the relaying terminal; and relay-means for developing a relay-operating force of variable magnitude dependent upon the proportion of the time during which the half-cycle operating-impulses are not being blocked by restraining-impulses which are received from a distant line-terminal.

3. Terminal equipment for a pilot-channel phase-angle relaying system for an alternating-current transmission-line, comprising line-current-responsive means for deriving a succession of substantially flat-topped operating impulses at times during positive line-current half-cycles, line-current-responsive pilot-channel means for transmitting a succession of restraining impulses to another line-terminal or terminals at times during negative line-current half-cycles of the line-current at the relaying terminal at which said terminal equipment is located, means for developing a relaying current only during those portions of the operating impulses during which no restraining impulses are being received from a distant line-terminal, and relay-means responsive to a predetermined integrated value of said relaying current.

4. Terminal equipment for a pilot-channel phase-angle relaying system for an alternating-current transmission-line, comprising line-current-responsive means, operative during conditions of fault on the transmission system, for deriving a succession of substantially constant-magnitude operating-impulses, each of substantially half-cycle duration, in response to successive line-current half-cycles of one polarity, at the relaying terminal; line-current-responsive pilot-channel means, operative during conditions of fault on the transmission system, for transmitting a succession of substantially constant-magnitude restraining-impulses, each of substantially half-cycle duration, to another line-terminal or terminals in response to successive line-current half-cycles of the opposite polarity, at the relaying terminal; means for developing a relaying current of relatively fixed magnitude during times during which the half-cycle operating-impulses are not being blocked by restraining-impulses which are received from a distant line-terminal, and relay-means responsive to a predetermined integrated value of said relaying current.

5. Terminal equipment for one terminal of a pilot-channel phase-angle relaying system for an alternating-current transmission-line, comprising line-current-responsive means for deriving a succession of substantially flat-topped operating impulses at times during positive line-current half-cycles, line-current - responsive pilot-channel means for transmitting a succession of restraining impulses to another line-terminal or terminals at times during negative line-current half-cycles of the line-current at the relaying terminal at which said terminal equipment is located, a relay-tube having control-circuit means, means for utilizing said operating impulses and said restraining impulses in said control-circuit means, and relay-means responsive to a predetermined integrated value of plate-cathode current in said relay-tube.

6. Terminal equipment for a pilot-channel phase-angle relaying system for an alternating-current transmission-line, comprising line-current-responsive means, operative during conditions of fault on the transmission system, for deriving a succession of substantially constant-magnitude operating-impulses, each of substantially half-cycle duration, in response to successive line-current half-cycles of one polarity, at the relaying terminal; line-current-responsive pilot-channel means, operative during conditions of fault on the transmission system, for transmitting a succession of substantially constant-magnitude restraining-impulses, each of substantially half-cycle duration, to another line terminal or terminals in response to successive line-current half-cycles of the opposite polarity, at the relaying terminal; a relay-tube having control-circuit means normally adjusted so that substantially no plate-cathode current flows in said tube; means for impressing said operating-impulses and said restraining-impulses on said control-circuit means; and relay-means responsive to said plate-cathode current.

7. Terminal equipment for a pilot-channel phase-angle relaying system for an alternating-current transmission-line, comprising line-current responsive means for deriving a relaying quantity of limited magnitude for responding to the phase-angle of the line-current input into the transmission-line at that terminal, pilot-channel means for transmitting a relaying quantity of limited magnitude to another line-terminal or terminals for responding to the phase of the relaying quantity at the transmitting terminal, circuit-means for combining the relaying quantity derived at the relaying terminal and the relaying quantity received from a distant line-terminal or terminals in such manner as to discriminate as to the phase-angular relations of said relaying quantities, a relay-tube having a control-circuit responsive to said circuit-means, and relay-means responsive to the plate-cathode current in said relay-tube.

8. Terminal equipment for a pilot-channel phase-angle relaying system for an alternating-current transmission-line, comprising line-current transmission-line, comprising line-current responsive means for deriving an alternating-current relaying quantity at the relaying terminal, two gas tubes of the sustained-discharge type, each tube having trigger-acting control-circuit means for firing the tube, direct-current plate-cathode-circuit energization-means for said two gas tubes, interconnecting impulsing-means between the plate-cathode circuits of said two gas tubes for responding to the moment of firing of either tube in such manner as to so impulse the effective plate-cathode voltage across the other tube as to extinguish said other tube, means for so applying said relaying quantity to the control-circuit means of the two gas tubes that the tubes fire during half-cycles of opposite polarity of said relaying quantity, and means including pilot-channel means for utilizing the intermittent operation of at least one of said two gas tubes for obtaining a response to the relative phase-angles of the relaying quantities derived at a plurality of different line-terminals.

9. Terminal equipment for a pilot-channel phase-angle relaying system for an alternating-current transmission-line, comprising line-current-responsive means, operative during conditions of fault on the transmission system, for deriving an alternating-current relaying quantity at the relaying terminal, two gas tubes of the sustained-discharge type, each tube having trigger-acting control-circuit means for firing the tube, direct-current plate-cathode-circuit energization-means for said two gas tubes, interconnecting impulsing-means between the plate-cathode circuits of said two gas tubes for responding to the moment of firing of either tube in such manner as to so impulse the effective plate-cathode voltage across the other tube as to extinguish said other tube, means for so applying said relaying quantity to the control-circuit means of the two gas tubes that the tubes fire during half-cycles of opposite polarity of said relaying quantity, means for obtaining a succession of operating-voltage impulses in response to the intermittent operation of one of said two gas tubes, means including pilot-channel means for responding to the intermittent operation of the other gas tube for transmitting a succession of restraining-voltage impulses to another line-terminal or terminals, and relay-means for developing a relay-operating force of variable magnitude dependent upon the proportion of the time during which the half-cycle operating-impulses are not being blocked by restraining-impulses which are received from a distant line-terminal.

10. Terminal equipment for a carrier-current phase-angle relaying system for an alternating-current transmission-line, comprising line-current-responsive means for deriving a succession of substantially flat-topped operating impulses at times during positive line-current half-cycles, line-current-responsive carrier-current means for transmitting a succession of restraining impulses to the transmission-line at times during negative line-current half-cycles of the line-current at the relaying terminal at which said terminal equipment is located, and relay-means for developing a variable operating force only during those portions of the operating impulses during which no restraining impulses are being received from the carrier-current on the transmission-line.

11. Terminal equipment for a carrier-current phase-angle relaying system for an alternating-current transmission-line, comprising line-current-responsive means, operative during conditions of fault on the transmission system, for deriving a succession of substantially constant-magnitude operating-impulses, each of substantially half-cycle duration, in response to successive line-current half-cycles, of one polarity, at the relaying terminal; line-current-responsive carrier-current means, operative during conditions of fault on the transmission system, for transmitting a succession of substantially constant-magnitude restraining-impulses, each of substantially half-cycle duration, to the transmission-line in response to successive line-current half-cycles of the opposite polarity, at the relaying terminal; and relay-means for developing a relay-operating force of variable magnitude dependent upon the proportion of the time during which the half-cycle operating-impulses are not being blocked by restraining-impulses which are received from the carrier-current on the transmission-line.

12. Terminal equipment for a carrier-current phase-angle relaying system for an alternating-current transmission-line, comprising line-current-responsive means for deriving a succession of substantially flat-topped operating impulses at times during positive line-current half-cycles, line-current-responsive carrier-current means for transmitting a succession of restraining impulses to the transmission-line at times during negative line-current half-cycles of the line-current at the relaying terminal at which said terminal equipment is located, means for developing a relaying current only during those portions of the operating impulses during which no restraining impulses are being received from the carrier-current on the transmission-line, and relay-means responsive to a predetermined integrated value of said relaying current.

13. Terminal equipment for a carrier-current phase-angle relaying system for an alternating-current transmission-line, comprising line-current-responsive means, operative during conditions of fault on the transmission system, for deriving a succession of substantially constant-magnitude operating-impulses, each of substantially half-cycle duration, in response to successive line-current half-cycles, of one polarity, at the relaying terminal; line-current-responsive carrier-current means, operative during conditions of fault on the transmission system, for transmitting a succession of substantially constant-magnitude restraining-impulses, each of substantially half-cycle duration, to the transmission-line in response to successive line-current half-cycles of the opposite polarity, at the relaying terminal; means for developing a relaying current of relatively fixed magnitude during times during which the half-cycle operating-impulses are not being blocked by restraining-impulses which are received from the carrier-current on the transmission-line, and relay-means responsive to a predetermined integrated value of said relaying current.

14. Terminal equipment for a carrier-current phase-angle relaying system for an alternating-current transmission-line, comprising line-current-responsive means for deriving a succession of substantially flat-topped operating impulses at times during positive line-current half-cycles, line-current-responsive means for transmitting carrier-current signals to the transmission-line at times during negative line-current half-cycles of the line-current at the relaying terminal at which said terminal equipment is located, carrier-current receiver-means for obtaining a succession of restraining impulses at times when there are carrier-current signals on the transmission-line, a relay-tube having control-circuit means, means for utilizing said operating impulses and said restraining impulses in said control-circuit means, and relay-means responsive to a predetermined integrated value of plate-cathode current in said relay-tube.

15. Terminal equipment for a carrier-current phase-angle relaying system for an alternating-current transmission-line, comprising line-current responsive means, operative during conditions of fault on the transmission system, for deriving a succession of substantially constant-magnitude operating-impulses, each of substantially half-cycle duration, in response to successive line-current half-cycles of one polarity, at the relaying terminal; line-current-responsive means, operative during conditions of fault on the transmission system, for transmitting a succession of substantially constant-magnitude carrier-current signals, each of substantially half-cycle duration, to the transmission-line, in response to successive line-current half-cycles of the opposite polarity, at the relaying terminal; carrier-current receiver-means for obtaining a succession of restraining impulses at times when there are carrier-current signals on the transmission-line; a relay-tube having control-circuit means normally adjusted so that substantially no plate-cathode current flows in said tube; means for impressing said operating-impulses and said restraining-impulses on said control-circuit means; and relay-means responsive to said plate-cathode current.

16. Terminal equipment for a carrier-current phase-angle relaying system for an alternating-current transmission-line, comprising line-current-responsive means, operative during conditions of fault on the transmission system, for deriving an alternating-current relaying quantity at the relaying terminal, two gas tubes of the sustained-discharge type, each tube having trigger-acting control-circuit means for firing the tube, direct-current plate-cathode-circuit energization-means for said two gas tubes, interconnecting impulsing-means between the plate-cathode circuits of said two gas tubes for responding to the moment of firing of either tube in such manner as to so impulse the effective plate-cathode voltage across the other tube as to extinguish said other tube, means for so applying said relaying quantity to the control-circuit means of the two gas tubes that the tubes fire during half-cycles of opposite polarity of said relaying quantity, means for obtaining a succession of operating-voltage impulses in response to the intermittent operation of one of said two gas tubes, means responsive to the intermittent operation of the other gas tube for transmitting a succession of restraining-voltages to the transmission line, and relay-means for developing a relay-operating force of variable magnitude dependent upon the proportion of the time during which the half-cycle operating-impulses are not being blocked by restraining impulses which are received from a distant line-terminal.

17. Carrier-current control-means for a protective relaying system for an alternating-current transmission-line, including, at each of a plurality of line-terminals, line-current-responsive means for deriving an alternating-current relaying quantity at the relaying terminal, two gas tubes of the sustained-discharge type, each tube having trigger-acting control-circuit means for firing the tube, direct-current plate-cathode-circuit energization-means for said two gas tubes, interconnecting impulsing-means between the plate-cathode circuits of said two gas tubes for responding to the moment of firing of either tube in such manner as to so impulse the effective plate-cathode voltage across the other tube as to extinguish said other tube, means for so applying said relaying quantity to the control-circuit means of the two gas tubes that the tubes fire during half-cycles of opposite polarity of said relaying quantity, carrier-current relaying equipment including a carrier-current transmitter having a tube, and means for utilizing the intermittent operation of at least one of said two gas tubes for intermittently energizing the plate-cathode circuit of said tube of the carrier-current transmitter.

18. Terminal equipment for a pilot-channel phase-angle relaying system for an alternating-current transmission-line, comprising local control-means, responsive solely to the local line-current, for deriving a succession of operating impulses at all times of fault during positive line-current half-cycles, line-current-responsive pilot-channel means, responsive solely to said local control-means, for transmitting a succession of restraining impulses and making them effective at another line-terminal or terminals at all times of fault during negative line-current half-cycles of the line-current at the relaying terminal at which said terminal equipment is located, and relay-means responsive solely to said operating impulses and said restraining impulses for developing a variable operating force only during those portions of the operating impulses during which no restraining impulses are being received from a distant line-terminal.

19. Terminal equipment for a pilot-channel phase-angle relaying system for an alternating-current transmission-line, comprising local control-means, responsive solely to the local line-current, for deriving a succession of operating impulses at all times of fault during positive line-current half-cycles, line-current-responsive pilot-channel means, responsive solely to said local control-means, for transmitting a succession of restraining impulses and making them effective at another line-terminal or terminals at all times of fault during negative line-current half-cycles of the line-current at the relaying terminal at which said terminal equipment is located, means responsive solely to said operating impulses and said restraining impulses for developing a relaying current only during those portions of the operating impulses during which no restraining impulses are being received from a distant line-terminal, and relay-means responsive to a predetermined integrated value of said relaying current.

20. Terminal equipment for a pilot-channel phase-angle relaying system for an alternating-current transmission-line, comprising local control-means, responsive solely to the local line-current, for deriving a succession of operating impulses at all times of fault during positive line-current half-cycles, line-current-responsive pilot-channel means, responsive solely to said local control-means, for transmitting a succession of restraining impulses and making them effective at another line-terminal or terminals at all times of fault during negative line-current half-cycles of the line-current at the relaying terminal at which said terminal equipment is located, a relay-tube having control-circuit means, means for utilizing only said operating impulses and said restraining impulses in said control-circuit means, and relay-means responsive to a predetermined integrated value of plate-cathode current in said relay-tube.

21. Terminal equipment for a carrier-current phase-angle relaying system for an alternating-current transmission-line, comprising local control-means, responsive solely to the local line-current, for deriving a succession of operating impulses at all times of fault during positive line-current half-cycles, line-current-responsive carrier-current means, responsive solely to said local control-means, for transmitting a succession of restraining impulses and making them effective at one or more terminals of the transmission-line at all times of fault during negative line-current half-cycles of the line-current at the relaying terminal at which said terminal equipment is located, and relay-means responsive solely to said operating impulses and said restraining impulses for developing a variable operating force only during those portions of the operating impulses during which no restraining impulses are being received from the carrier-current.

22. Terminal equipment for a carrier-current phase-angle relaying system for an alternating-current transmission-line, comprising local control-means, responsive solely to the local line-current, for deriving a succession of operating impulses at all times of fault during positive line-current half-cycles, line-current-responsive carrier-current means, responsive solely to said local control-means, for transmitting a succession of restraining impulses and making them effective at one or more terminals of the transmission-line at all times of fault during negative line-current half-cycles of the line-current at the relaying terminal at which said terminal equipment is located, means responsive solely to said operating impulses and said restraining impulses for developing a relaying current only during those portions of the operating impulses during which no restraining impulses are being received from the carrier-current, and relay-means responsive to a predetermined integrated value of said relaying current.

23. Terminal equipment for a carrier-current phase-angle relaying system for an alternating-current transmission-line, comprising local control-means, responsive solely to the local line-current, for deriving a succession of operating impulses at all times of fault during positive line-current half - cycles, line - current - responsive means, responsive solely to the local control-means, for transmitting carrier-current signals to the transmission-line at all times of fault during negative line-current half-cycles of the line-current at the relaying terminal at which said terminal equipment is located, carrier-current receiver-means for obtaining a succession of restraining impulses at times when there are carrier-current signals on the transmission-line, a relay-tube having control-circuit means, means for utilizing solely said operating impulses and said restraining impulses in said control-circuit means, and relay-means responsive to a predetermined integrated value of plate-cathode current in said relay-tube.

ARTHUR C. MEHRING.
HERBERT W. LENSNER.
SHIRLEY L. GOLDSBOROUGH.